US012700991B2

(12) United States Patent
Zhao et al.

(10) Patent No.: US 12,700,991 B2
(45) Date of Patent: Aug. 4, 2026

(54) DATA SECURITY FOR FORMAT-PRESERVING DATA TRANSFORMING

(71) Applicant: Lemon Inc., Grand Cayman (KY)

(72) Inventors: Yongjun Zhao, Beijing (CN); Wei Dai, Culver City, CA (US); Donghang Lu, Culver City, CA (US); Qiang Yan, Beijing (CN)

(73) Assignee: Lemon Inc., Grand Cayman (KY)

( * ) Notice: Subject to any disclaimer, the term of this patent is extended or adjusted under 35 U.S.C. 154(b) by 167 days.

(21) Appl. No.: 18/498,308

(22) Filed: Oct. 31, 2023

(65) Prior Publication Data

US 2025/0141657 A1 May 1, 2025

(51) Int. Cl.
*H04L 9/06* (2006.01)
*H04L 9/08* (2006.01)

(52) U.S. Cl.
CPC .......... *H04L 9/0631* (2013.01); *H04L 9/0861* (2013.01); *H04L 9/0891* (2013.01)

(58) Field of Classification Search
CPC .... H04L 9/0631; H04L 9/0861; H04L 9/0891
See application file for complete search history.

(56) References Cited

U.S. PATENT DOCUMENTS

| | | | | | |
|---|---|---|---|---|---|
| 4,933,969 | A * | 6/1990 | Marshall | ................. | G06F 21/79 |
| | | | | | 713/181 |
| 8,744,078 | B2 * | 6/2014 | Coleridge | ............ | H04L 9/0869 |
| | | | | | 380/282 |
| 9,634,836 | B1 * | 4/2017 | Butzer | ................. | H04L 9/0861 |
| 9,906,361 | B1 * | 2/2018 | Perlman | ................. | G06F 16/22 |
| 10,937,339 | B2 * | 3/2021 | Lightowler | ........... | H04L 9/0643 |
| 2010/0290623 | A1 * | 11/2010 | Banks | ................. | G06F 21/6227 |
| | | | | | 707/E17.005 |
| 2017/0161516 | A1 * | 6/2017 | Mondal | .................. | H04L 63/06 |
| 2018/0324585 | A1 * | 11/2018 | Nair | ..................... | H04W 12/069 |
| 2019/0007390 | A1 * | 1/2019 | Wu | ........................ | H04L 9/0861 |
| 2020/0250334 | A1 * | 8/2020 | Bandi | ..................... | G06F 21/78 |

(Continued)

FOREIGN PATENT DOCUMENTS

| | | | | | | |
|---|---|---|---|---|---|---|
| CN | | 102271037 | A * | 12/2011 | ........... | H04L 9/0822 |
| CN | | 103391187 | B * | 12/2016 | ........... | H04L 9/0822 |

(Continued)

OTHER PUBLICATIONS

Sun et al., "Practical Backward-Secure Searchable Encryption from Symmetric Puncturable Encryption", Session 4D: Encrypted Search & Computation 1, Oct. 15-19, 2018, 19 pages provided.

(Continued)

*Primary Examiner* — John B King
(74) *Attorney, Agent, or Firm* — Fish & Richardson P.C.

(57) ABSTRACT

Methods and systems for data security are provided. The method includes generating respective tags for data segments in a dataset, deriving respective temporal keys associated with the respective tags for the plurality of data segments from a master key, and transforming the plurality of data segments from a plaintext to a ciphertext using the respective temporal keys as a first input and the respective tags as a second input, while format-preserving the data segments. The master key can be updated to prevent from reverse-transforming a selected data segment in the dataset from the ciphertext to the plaintext.

20 Claims, 5 Drawing Sheets

300
310 Generate tags for data segments
320 Derive temporal keys for the data segments
330 Transform the data segments
340 Update master key to prevent from reverse-transforming

(56)                    References Cited

U.S. PATENT DOCUMENTS

2022/0286282 A1 *  9/2022  Jeljeli  .................. H04L 9/0894
2023/0261881 A1 *  8/2023  Liu  ...................... H04L 9/0891
                                                    713/176

FOREIGN PATENT DOCUMENTS

CN         120811737   A  * 10/2025
KR        20070047068  A  *  5/2007  ........... H04L 9/0861
RU         2004133759  A  *  8/2005  ........... G06F 21/575
WO        WO-9912309   A1 *  3/1999  ........... H04L 9/0643
WO       WO-2016132547 A1 *  8/2016  ........... H04L 9/0891

OTHER PUBLICATIONS

Sun et al., "Incremental symmetric puncturable encryption with
support for unbounded number of punctures", Des. Codes Cryptogr.
91, pp. 1401-1426, 2023. https://doi.org/10.1007/s10623-022-01143-
y.
Bellare et al., "Format-Preserving Encryption", SAC2009, LNCS5867,
pp. 295-312, 2009, Springer-Verlag Berlin Heidelberg.

* cited by examiner

500

505 CPU

510 ROM

515 RAM

520

525 I/O Interface

530 Input

535 Output

540 Storage

545 Communication

550 Driver

555 Removable Medium

DATA SECURITY FOR FORMAT-PRESERVING DATA TRANSFORMING

FIELD

The embodiments described herein pertain generally to data security for format-preserving data transforming. More specifically, the embodiments described herein pertain to data security for format-preserving data transforming for dynamic databases.

BACKGROUND

Databases are often dynamic. For example, when a user account is canceled, the database needs to be updated to remove or delete the user's data from the database. The privacy of the deleted user data may be affected by data breaches that may happen after the deletion. Consider an attacker who broke into a database system and obtained a snapshot of the encrypted database on a first date. The decryption key of the database may be well-protected, hence it may take a few weeks for the attacker to eventually obtain the decryption key on a later, second date. Any user data deleted between the first date and the second date may still be affected by the decryption key leakage on the second date.

SUMMARY

There is a desire to provide data security for dynamic databases. In particular, there is a desire to transform data in the dynamic databases, satisfying security requirements (e.g., forward secrecy) while preserving the original data format (e.g., data lengths, data types, or overall formats) at the same time. As referenced herein, "forward secrecy" may refer to a feature of cryptography protocols/algorithms that can assure the security of any past data (e.g., user data deleted between an earlier first date and a later second date) by preventing the past data from being affected by a key compromise at a later date (e.g., the second date).

In one example, when a user account is canceled, features in the embodiments described herein can update the database to remove or delete the user's data from the database. The deleted data may be a ciphertext obtained by format-preserving, data transforming the original plaintext, by using a temporal key derived from an original master key as a first input and the associated tag as a second input. Features in the embodiments described herein can update the original master key, revoke the original master key's ability of reverse-transforming (e.g., decrypting) the ciphertext, and prevent an attacker from decrypting the user's data, e.g., using the original master key. In this manner, the privacy of deleted user data can be protected, even if the attacker obtained the encrypted database on the first date before the deletion, and obtained the decryption key (e.g., the original master key) on the later, second date after the deletion. That is, features of the embodiments described herein can prevent the security of any user data modified/deleted between the first date and the second date from being affected by the decryption key leakage on the second date. Accordingly, forward secrecy can be preserved, with the security of the past (e.g., modified/deleted) data not being affected by a key compromise at a later time.

In one example embodiment, a method for secure computation and communication is provided. The method includes generating respective tags for a plurality of data segments in a dataset, deriving respective temporal keys associated with the respective tags for the plurality of data segments from a master key, transforming the plurality of data segments from a plaintext to a ciphertext using the respective temporal keys as a first input and the respective tags as a second input, while format-preserving the plurality of data segments, and updating the master key to prevent the master key from reverse-transforming a selected data segment of the plurality of data segments from the ciphertext to the plaintext.

In another example embodiment, a secure computation and communication system is provided. The system includes a memory to store a dataset comprising a plurality of data segments, and a processor. The processor is to generate respective tags for the plurality of data segments, derive respective temporal keys associated with the respective tags for the plurality of data segments from a master key, transform the plurality of data segments in the dataset from a plaintext to a ciphertext using the respective temporal keys as a first input and the respective tags as a second input, while format-preserving the plurality of data segments, and update the master key to prevent the master key from reverse-transforming a selected data segment of the plurality of data segments from the ciphertext to the plaintext.

In yet another example embodiment, a non-transitory computer-readable medium having computer-executable instructions stored thereon is provided. The instructions, upon execution, cause one or more processors to perform operations including generating respective tags for a plurality of data segments in a dataset, deriving respective temporal keys associated with the respective tags for the plurality of data segments from a master key, transforming the plurality of data segments in the dataset from a plaintext to a ciphertext using the respective temporal keys as a first input and the respective tags as a second input, while format-preserving the plurality of data segments, and updating the master key to prevent the master key from reverse-transforming a selected data segment of the plurality of data segments from the ciphertext to the plaintext.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
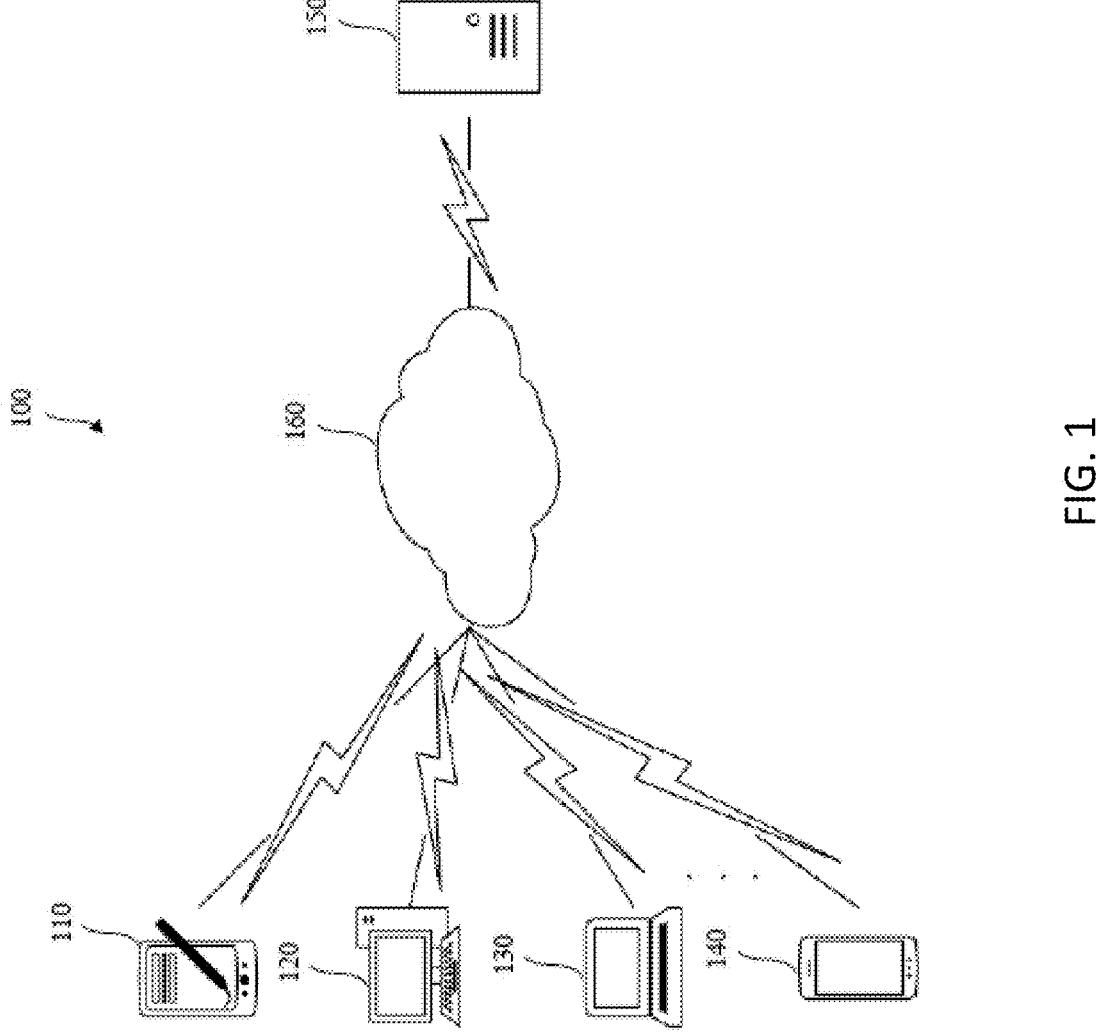
FIG. 1 is a schematic view of an example data security system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, etc.), and/or one or more attributes or features or values associated with the one or more identifications.

As referenced herein, a "data segment" may refer to a unit of data that can be organized, managed, and/or accessed in a dataset or database. Data segments can be used to represent specific pieces of information or records, for example, various user data associated with user accounts. In an example, data segments may be represented as row(s) and/or column(s) in a table, where each row corresponds to a record with attributes or fields.

As referenced herein, a "tag" of a data segment may refer to a piece of metadata or an identifier that is associated with that specific data segment. A tag can distinguish one data segment from another in a dataset.

As referenced herein, "format preserving" or "format-preserving" may refer to a property or feature of data transformation that can retain the format or structure of the original data (e.g., plaintext) while securing it through data transformation (e.g., encryption). In other words, when data is format-preserving transformed (e.g., encrypted), the resulting ciphertext can maintain a similar structure, data type, or format as the original plaintext. For example, the corresponding plaintext and ciphertext may include numerical values, characters, or symbols from the same finite alphabet. One example of format-preserving transforming is format-preserving encryption (FPE), which may be a specific type of symmetric key encryption, and is suitable for encryption applications that can maintain the format (e.g., length, data type, or overall format) of database fields such as, for example, user names, phone numbers, e-mail addresses, or other structured data elements. For example, an FPE algorithm can encrypt a 10-digit phone number in such a way that the resulting ciphertext is also a 10-digit number, maintaining the original format.

As referenced herein, "data transforming" may refer to the function or operation to "transform" or of "transforming" a dataset or one or more data segments thereof, including processing (e.g., encrypting, decrypting, encoding, decoding, manipulating, compressing, decompressing, converting, etc.) the dataset or one or more data segments thereof. A data segment of a dataset may refer to, e.g., one or more columns (or rows) of a dataset such as one or more identification fields/columns (or records/rows), etc. One example of data transforming is encryption which may refer to the process of converting plaintext (unencrypted data) into ciphertext (encrypted data) using encryption algorithms and keys. "Reverse-transforming" or "reverse transforming" may refer to the function or operation to reverse the process of transforming. One example of data reverse transforming is decryption which may refer to the process of converting ciphertext (encrypted data) back into plaintext (unencrypted data) using decryption algorithms and keys.

As referenced herein, a "transforming scheme" may refer to an algorithm, protocol, or function of performing the processing (e.g., encrypting, decrypting, encoding, decoding, manipulating, compressing, decompressing, converting, etc.) of the dataset or one or more data segments thereof.

As referenced herein, a "symmetric key algorithm," "symmetric encryption algorithm," or "symmetric cryptography" is a term of art and may refer to algorithms for cryptography that use the same cryptographic keys for both the encryption of data (i.e., plaintext) and the decryption of data (i.e., ciphertext). The cryptographic keys may be identical, or there may be a simple transformation between the cryptographic keys. The same key can be used for both the transformation of plaintext (i.e., unencrypted data) into ciphertext (i.e., encrypted data), and the reverse-transformation of ciphertext back into plaintext. Example symmetric key algorithms include advanced encryption standard (AES).

As referenced herein, a "secret key" may refer to a cryptographic key that is used to perform transforming (e.g., encryption) or reverse-transforming (e.g., decryption) in a symmetric key algorithm. A secret key may refer to (i) a master key for initializing a symmetric key algorithm and deriving secondary or temporal keys based on the respective tags associated with the data segments in a dataset, and/or (ii) the secondary or temporal keys derived from the master key. The secondary or temporal keys can be used to transform or reverse-transform the data segments based on the associated tags, and can be specific for different data segments.

FIG. 1 is a schematic view of an example data security system 100, arranged in accordance with at least some embodiments described herein. In an example embodiment, the system 100 may be a digital advertisement system, a social media application system, etc.

The system 100 may include terminal devices 110, 120, 130, and 140, a network 160, and a server (e.g., a server for a digital advertisement platform, a server for an advertiser, etc.) 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services, such as digital advertisement services, online shopping services, etc., to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as social media applications, online shopping services, or the like, may be installed on the terminal devices 110, 120, 130, and 140.

It is to be understood that software applications or services according to the embodiments described herein and/or according to the services provided by the digital advertisement and/or online shopping service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
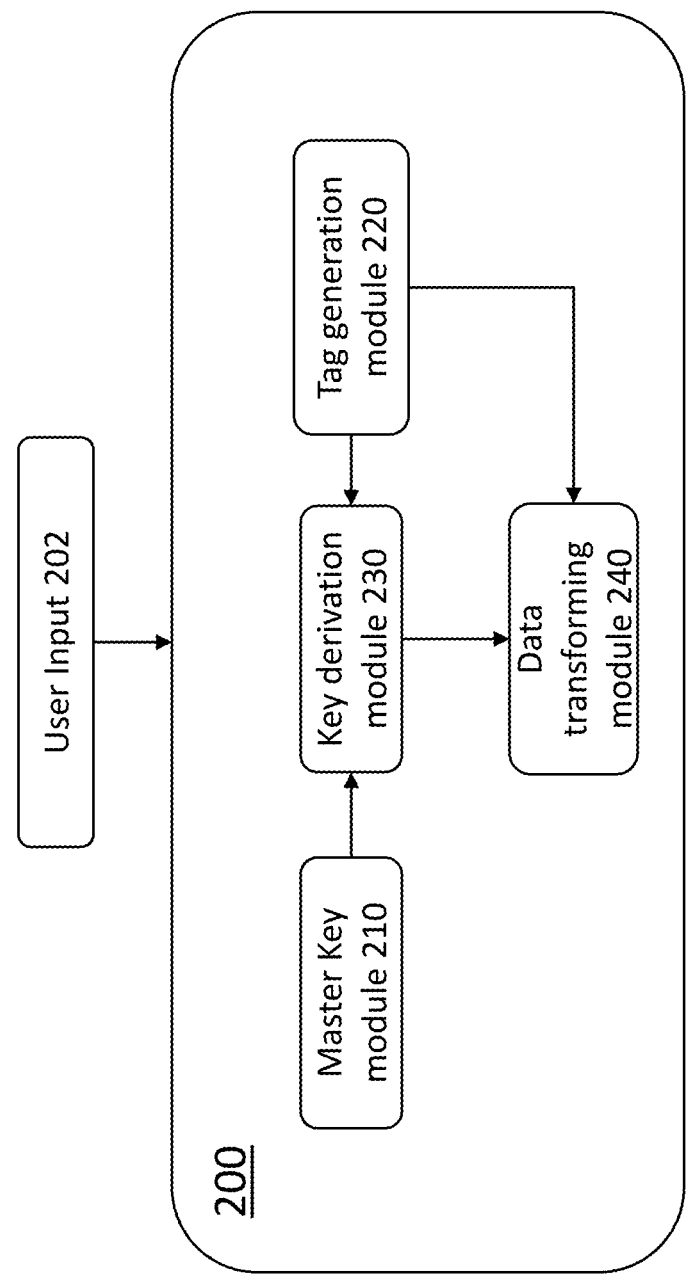
FIG. 2 is a block diagram of an example system to provide data security for format-preserving data transforming, in accordance with at least some embodiments described herein.

FIG. 2 is a schematic diagram of an example system 200 to provide data security (e.g., satisfying the security requirement of forward secrecy) for format-preserving data transforming, arranged in accordance with at least some embodiments described herein.

Data security system 200 includes functional blocks or modules 210, 220, 230 and 240. It should be appreciated that such functional blocks may be realized by any number of hardware and/or software components configured to perform the specified functions. It is also to be understood that the data security system 200 and its functional blocks disclosed herein can be implemented by one or more processors (e.g., the processor of one or more of the terminal device 110, 120, 130, and 140 of FIG. 1, the processor of the server 150 of FIG. 1, the central processor unit 505 of FIG. 5, and/or any other suitable processor), unless otherwise specified.

Data security system 200 receives a user input 202 for data operation(s) for data that may be stored in a database or dataset. In an embodiment, the security system 200 may receive an indication to change, update, or delete one or more data segments in the dataset. For example, the data security system 200 may receive a user request to cancel the user's account. The data security system 200 can update the dataset by removing or deleting the user's data, e.g., one or more selected data segments related to the user account, from the dataset.

Tag generation module 220 generates respective tags for the data segments in the dataset. The tags can be generated as an identifier or label that can uniquely or semantically distinguish each data segment from others in the dataset. That is, the respective tags for the data segments in the dataset can be different from each other, and are segment-specific. The tags can be used to facilitate data retrieval and organization of the data segments in the dataset. An example tag is a timestamp which may represent the date and time at which a particular data segment was created, transformed, or modified. For example, when the data security system 200 receives a user input 202 to create, add, or modify user data, the tag generation module 220 can generate a unique time-stamp as an identifier for the related data segment(s). In an example embodiment, the tag generation module 220 can generate the unique tag associated with a specific data segment at the time of transforming, e.g., by data transforming module 240, that specific data segment.

Master key module 210 can initiate (e.g., receive or generate) a secret key as an initial or original master key (i.e., $msk_0$) which can be used by key derivation module 230 to derive respective temporal keys for data segments in the dataset. The secret key can be generated by using any suitable symmetric key algorithms or schemes with specified security parameter(s) to satisfy the security requirement of forward secrecy. During the generation process, suitable cryptographic operations can be performed to create the secrete key that can serve as the initial or original master key. It is to be understood that, in an example embodiment, the same initial or original master key can be generated for the whole or a portion of the data segments in a dataset. It is to be understood that the master key module 210 may include a master key generation submodule to generate the initial or original master key (i.e., $msk_0$) at a setup phase, and a master key updating submodule to provide subsequent updates to the master key.

Key derivation module 230 derives, from the master key, respective temporal keys associated with the respective tags for the corresponding data segments. In an example embodiment, a suitable key derivation algorithm can be used, by taking the master key and the specific tag as input to generate a temporal key for the associated data segment. The derived temporal key may be specific to the combination of the master key and the tag. Each data segment in the dataset may have its own distinct temporal key for data transforming and/or reverse-transforming.

Data transforming module 240 transforms a data segment from a plaintext to a ciphertext using the respective temporal keys as a first input and the respective tags as a second input, while format-preserving the data segment. That is, the corresponding plaintext and ciphertext may have substantially the same format including, for example, substantially the same data length, substantially the same data type, substantially the same overall format, etc. Data transforming module 240 takes a tag associated with a specific data segment as the second input, along with the temporal key as a transforming key, which can provide a relatively stronger level of security, while preserving the original data format of the specific data segment associated with that tag. Any suitable format-preserving transforming algorithms or schemes can be used to perform the transforming (e.g., encryption) or reverse-transforming (e.g., decryption). It is to be understood that (i) when the second input (e.g., a tag) is missing, the ciphertext for the same encryption key and message (e.g., plaintext) can be the same, and (ii) when different second inputs (e.g., different tags) are used to transform (e.g., encrypt) the same message (e.g., plaintext), the results (e.g., ciphertexts) can be different. It is also to be understood that in a format-preserving transforming algorithm or scheme, the ciphertext may preserve the format of the corresponding message (e.g., plaintext), regardless of whether the second input (e.g., a tag) is used.

Master key module 210 can update the master key (e.g., from a current version of master key $msk_i$ to an updated version of master key $msk_{i+1}$) to prevent the original master key (e.g., $msk_i$) from reverse-transforming a selected data segment in the dataset from the ciphertext to the plaintext. For example, the master key module 210 may take (i) the current version of the master key $msk_i$ as a first input and (ii) the tag $t_i$ associated with the selected data segment as a second input to output the updated version of master key $msk_{i+1}$. In an example embodiment, when the data security system 200 receives the user input 202 to change a selected data segment, the master key module 210 can use the tag of the selected data segment to update the original master key to an updated or new master key, which can revoke the access to the key derivation module 230 for deriving a temporal key to reverse-transform the selected data segment from the ciphertext to the plaintext.

While the selected data segment is modified or deleted, the original tag may still be associated with the selected data segment and its ciphertext as an identifier. It is to be understood that, in an example embodiment, when the selected data segment is modified/updated, the tag generation module 220 may generate an updated tag for the updated data segment as an identifier, and the master key module 210 and the key derivation module 230 may use the updated tag to generate, update or derive key(s).

In an example embodiment, the updated master key can revoke the access to decrypting the ciphertext of the selected data segment. The master key module 210 can replace the original master key with the updated master key, and delete the original master key to prevent possible decryption key leakage.

It is to be understood that the ability of the updated master key to reverse-transform the data segments other than the selected data segment may remain intact. For example, the updated master key can still access to the key derivation module 230 to derive respective temporal keys associated with the respective tags for the corresponding data segments in the dataset, except for the selected data segment. For example, when a user's account is canceled, the system 200 can update the master key to revoke its ability to reverse transform the data segment(s) associated with that user's account from ciphertext to plaintext. The updated master key can still be used to reverse transform other data segment(s) associated with other user accounts in the dataset from ciphertext to plaintext.

Figure 3:
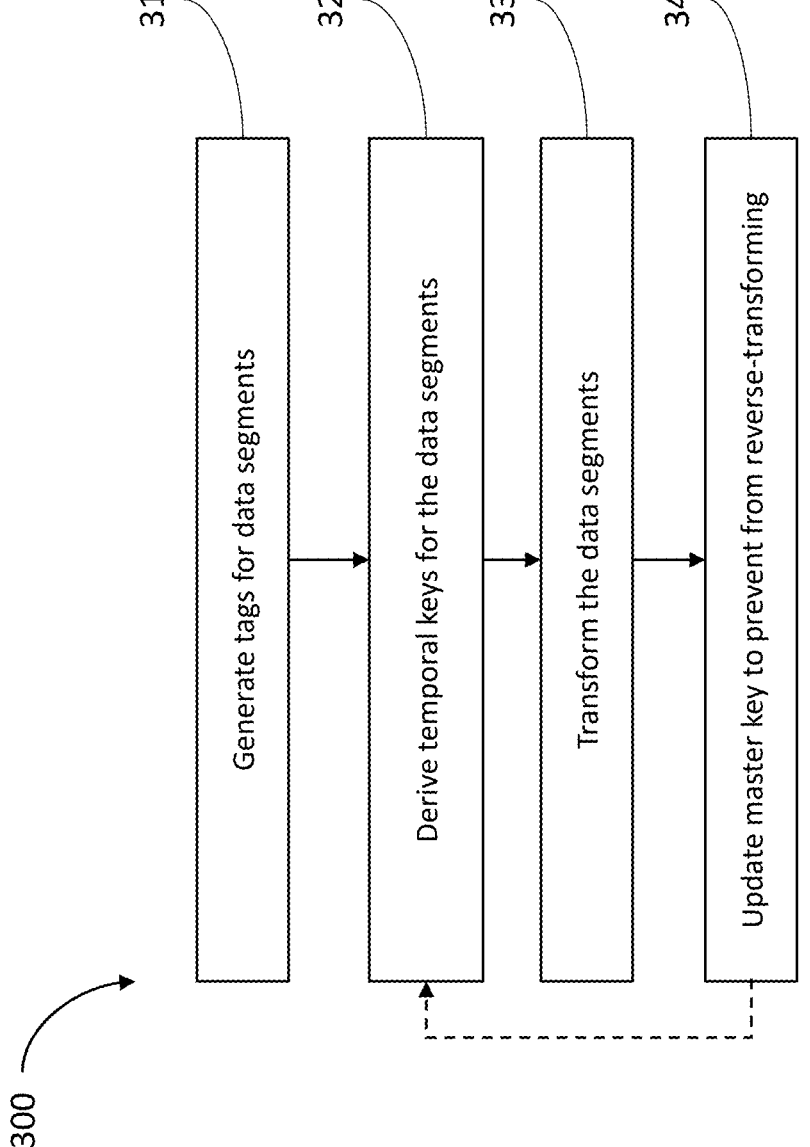
FIG. 3 is a flow chart illustrating an example of providing data security for format-preserving data transforming, in accordance with at least some embodiments described herein.
Figures 4A, 4B:
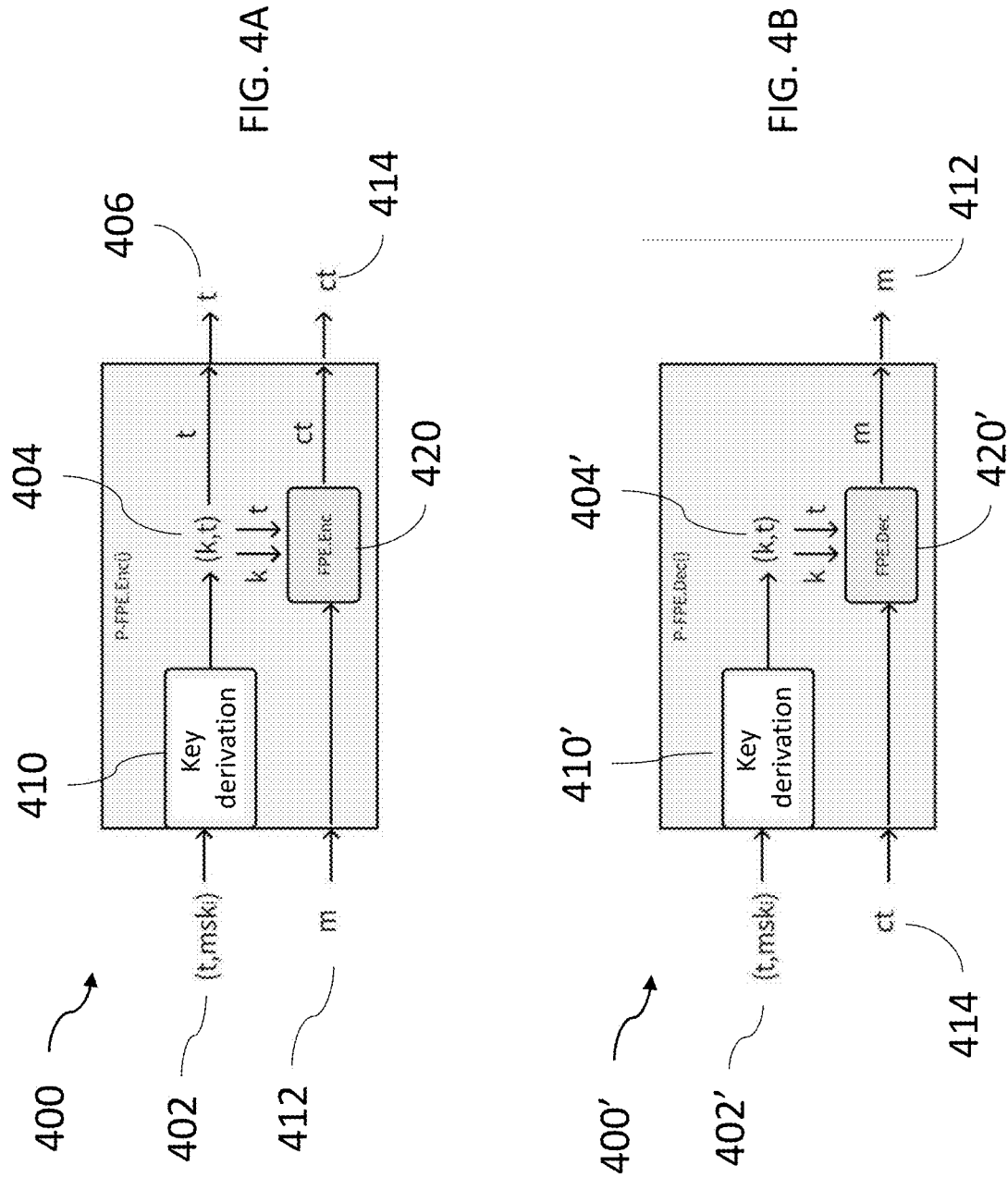
FIG. 4A shows a schematic diagram illustrating an example process of format-preserving data transforming, in accordance with at least some embodiments described herein.
FIG. 4B shows a schematic diagram illustrating an example process of data reverse-transforming, in accordance with at least some embodiments described herein.

FIG. 3 is a flow chart illustrating an example processing flow 300 of providing data security for format-preserving data transforming, in accordance with at least some embodiments described herein. FIG. 4A shows a schematic diagram illustrating an example process 400 of format-preserving data transforming, in accordance with at least some embodiments described herein. FIG. 4B shows a schematic diagram illustrating an example process 400' of data reverse-transforming, in accordance with at least some embodiments described herein.

Figure 5:
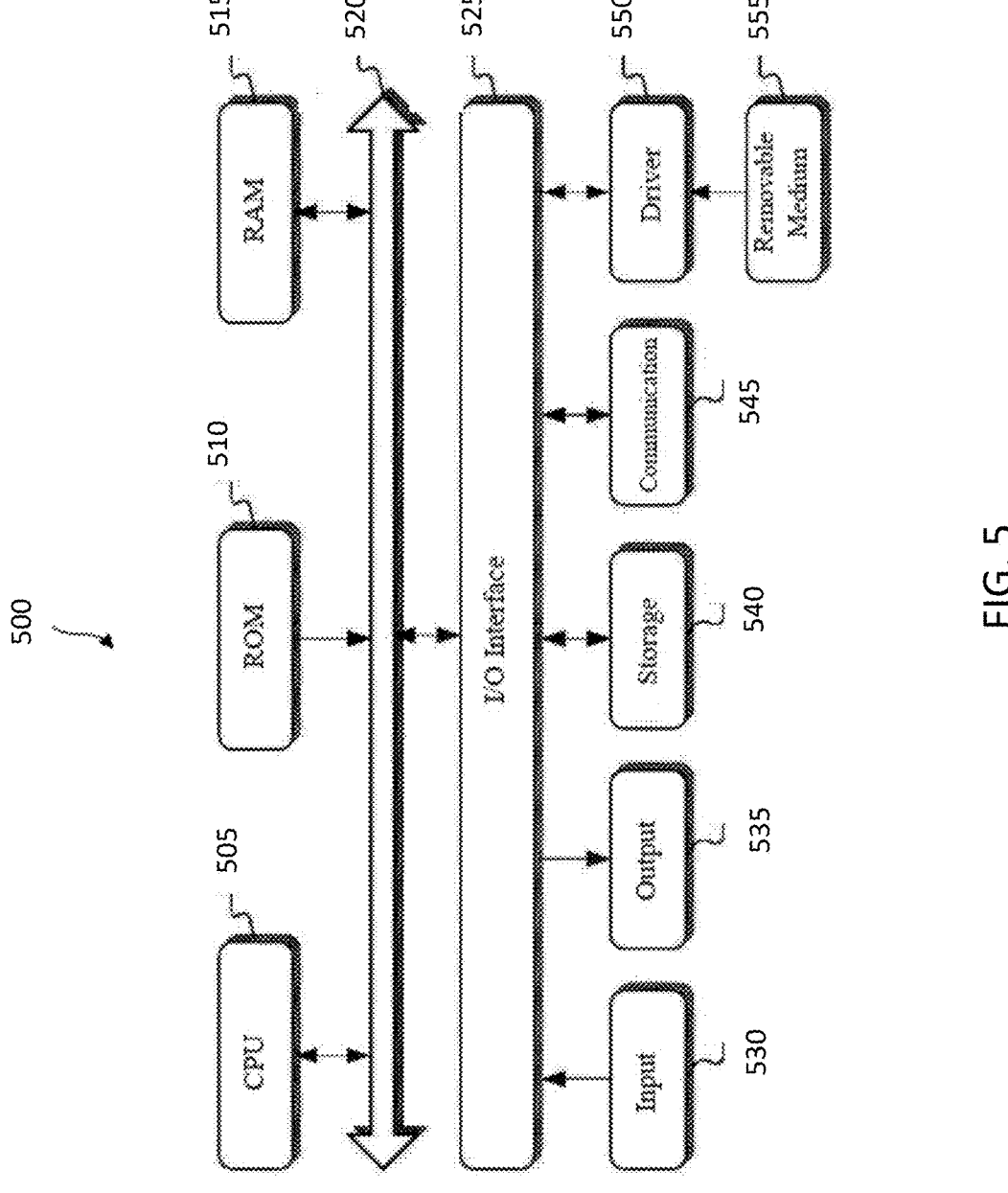
FIG. 5 is a schematic structural diagram of an example computer system applicable to implementing an electronic device, arranged in accordance with at least some embodiments described herein.

It is to be understood that the processing flow 300 disclosed herein can be conducted by one or more processors (e.g., the processor of one or more of the terminal device 110, 120, 130, and 140 of FIG. 1, the processor of the server 150 of FIG. 1, the central processor unit 505 of FIG. 5, and/or any other suitable processor), unless otherwise specified.

It is also to be understood that the processing flow 300 can include one or more operations, actions, or functions as illustrated by one or more of blocks 310, 320, 330, and 340. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 300, operations including initializations or the like may be performed. For example, system parameters and/or application parameters may be initialized. Processing flow 300 may begin at block 310.

At block 310 (Generate tags for data segments), the processor may generate a tag as an identifier for each of the data segments in a dataset. In an example embodiment, the dataset may include multiple data segments (e.g., tens or hundreds of thousands elements such as records, rows, etc.). The tag generation module 220 of the system 200 in FIG. 2 can generate a tag as an identifier or label that can uniquely or semantically distinguish each data segment from others. That is, the respective tags for the data segments in the dataset can be different from each other. An example tag is a timestamp which may represent the date and time at which a particular data segment was created or modified. For example, when the data security system 200 receives a user input 202 to create, add, or modify user data, the tag generation module 220 can generate a unique timestamp as an identifier for the related data segment(s) in the dataset. Processing may proceed from block 310 to block 320.

At block 320 (Derive temporal keys for the data segments), the processor may derive respective temporal keys associated with the respective tags for the data segments in the dataset from a master key. The master key module 210 of the system 200 in FIG. 2 can generate a secret key as the master key to derive the respective temporal keys for the data segments in the dataset.

For example, as depicted in the embodiment of FIG. 4A, with input 402, the key derivation module 230 of the system 200 in FIG. 2 can generate, at block 410 (Key derivation), output 404. The input 402 includes the master key (msk$_i$) and the respective tags (t) for the corresponding data segments in the dataset. The output 404 includes the respective temporal keys (k) associated with the respective tags (t) for the corresponding data segments in the dataset. Processing may proceed from block 320 to block 330.

At block 330 (Transform the data segments), the processor of the respective device may transform the data segments in the dataset from a plaintext to a ciphertext using the respective temporal keys as a first input and the respective tags as a second input, while format-preserving the data segments (i.e., the corresponding plaintext and ciphertext have substantially the same format). Any suitable format-preserving transformation (e.g., FPE) algorithms or schemes can be used to perform the transforming (e.g., encryption) or reverse-transforming (e.g., decryption).

By the non-limiting embodiments described and recited herein, when a suitable format-preserving transforming (e.g., FPE) algorithm is utilized, a tag can be used as the second input, along with the temporal key as a transforming key, which can provide a relatively stronger level of security, while preserving the original data format of the specific data segment associated with that tag. In other words, the tag can serve as a unique identifier for a specific data segment, and also be used as the second input for format-preserving transforming to preserve the format or structure of the original data. The tag can help to achieve a higher security level for the format-preserving by allowing the transforming process to adapt to the format requirements, ensuring that the ciphertext maintains the same format or structure as the plaintext.

For example, as depicted in the embodiment of FIG. 4A, with the output 404 from block 410 (Key derivation) provided as input(s), the data transforming module 240 of the system 200 in FIG. 2 can transform, at block 420 (FPE.Enc), the data segments in the dataset from a plaintext (m) 412 to a ciphertext (ct) 414, using the respective temporal keys (k) of the output 404 as a first input and the respective tags (t) of the output 404 as a second input. The transformation from the plaintext (m) 412 to the ciphertext (ct) 414 is format-preserving. That is, the plaintext (m) 412 to the ciphertext (ct) 414 may have substantially the same format including, e.g., substantially the same data length, substantially the same data type, substantially the same overall format, etc. For example, the plaintext (m) 412 may include a 10-digit phone number, which can be encrypted to the ciphertext (ct) 414 including also a 10-digit number, maintaining the original format. Processing may proceed from block 330 to block 340.

At block 340 (Update master key to prevent from reverse-transforming), the processor may update the master key to prevent the master key from reverse-transforming a selected data segment in the dataset from the ciphertext to the plaintext. In an example embodiment, when the data security system 200 of FIG. 2 receives an indication to change a selected data segment, the master key module 210 can use the tag of the selected data segment to update the master key to an updated or new master key, which can revoke the access to the key derivation module 230 for deriving, from the updated master key, a temporal key to reverse-transform the selected data segment from the ciphertext to the plaintext.

In an example embodiment, processing may proceed from block 340 to block 320. The updated or new master key can be used to derive respective temporal keys associated with the respective tags for the data segments in the dataset except for the selected data segment.

With the updated or new master key, the key derivation module 230 may still generate respective temporal keys to reverse-transform the data segments in the dataset except for the selected data segment, since the access to deriving such a temporal key for the selected data segment has been revoked by updating the master key. For example, the updated master key can revoke the access to decrypting the ciphertext of the selected data segment when receiving an indication to modify/delete the selected data segment from the dataset. The selected data segment is then modified/deleted from the dataset, along with the updating of the master key to revoke the decryption ability of the original master key for the modified/deleted data segment.

For example, as depicted in the embodiment of FIG. 4B, with input 402', the key derivation module 230 of the system 200 in FIG. 2 can generate, at block 410' (Key derivation), output 404'. The input 402' includes the updated or new master key (msk$_j$) and the respective tags (t) for the data segments in the dataset. The output 404' includes the respective temporal keys (k) associated with the respective tags (t) for the corresponding data segments except for the selected data segment. With the output 404' from block 410' (Key derivation) provided as input(s), the data transforming module 240 of the system 200 in FIG. 2 can reverse-transform, at block 420' (FPE.Dec), the data segments in the dataset from the ciphertext (ct) 414 to the plaintext (m) 412 except for the selected data segment. The reverse transforming from the ciphertext (ct) 414 to the plaintext (m) 412 can also be format-preserving.

FIG. 5 is a schematic structural diagram of an example computer system 500 applicable to implementing an electronic device (for example, the server or one of the terminal devices shown in FIG. 1), arranged in accordance with at least some embodiments described herein. It is to be understood that the computer system shown in FIG. 5 is provided for illustration only instead of limiting the functions and applications of the embodiments described herein.

As depicted, the computer system 500 may include a central processing unit (CPU) 505. The CPU 505 may perform various operations and processing based on programs stored in a read-only memory (ROM) 510 or programs loaded from a storage device 540 to a random-access memory (RAM) 515. The RAM 515 may also store various data and programs required for operations of the system 500. The CPU 505, the ROM 510, and the RAM 515 may be connected to each other via a bus 520. An input/output (I/O) interface 525 may also be connected to the bus 520.

The components connected to the I/O interface 525 may further include an input device 530 including a keyboard, a mouse, a digital pen, a drawing pad, or the like; an output device 535 including a display such as a liquid crystal display (LCD), a speaker, or the like; a storage device 540 including a hard disk or the like; and a communication device 545 including a network interface card such as a LAN card, a modem, or the like. The communication device 545 may perform communication processing via a network such as the Internet, a WAN, a LAN, a LIN, a cloud, etc. In an embodiment, a driver 550 may also be connected to the I/O interface 525. A removable medium 555 such as a magnetic disk, an optical disk, a magneto-optical disk, a semiconductor memory, or the like may be mounted on the driver 550 as desired, such that a computer program read from the removable medium 555 may be installed in the storage device 540.

It is to be understood that the processes described with reference to the flowchart of FIG. 3 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 545, and/or may be installed from the removable medium 555. The computer program, when being executed by the central processing unit (CPU) 505, can implement the above functions specified in the method in the embodiments disclosed herein.

Compared with the existing algorithms, protocols, or systems, testing and/or analysis indicate that with the features in the embodiments disclosed herein, improved data security (e.g., forward secrecy) can be provided for format-preserving data transforming for dynamic databases. In particular, the security requirement of forward secrecy and the requirement of format preserving can be satisfied at the same time.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects

It is appreciated that any one of aspects can be combined with each other.

Aspect 1. A method of providing data security comprising:

generating respective tags for a plurality of data segments in a dataset;

deriving respective temporal keys associated with the respective tags for the plurality of data segments from a master key;

transforming the plurality of data segments from a plaintext to a ciphertext using the respective temporal keys as a first input and the respective tags as a second input, while format-preserving the plurality of data segments; and updating the master key to prevent the master key from reverse-transforming a selected data segment of the plurality of data segments from the ciphertext to the plaintext.

Aspect 2. The method of aspect 1, wherein the master key is changed to an updated master key when receiving an indication to change the selected data segment.

Aspect 3. The method of aspect 2, wherein the updating of the master key comprises revoking access to deriving, from the updated master key, the temporal key to reverse-transform the selected data segment from the ciphertext to the plaintext.

Aspect 4. The method of aspect 2 or 3, further comprising: replacing the master key with the updated master key; and deleting the master key.

Aspect 5. The method of any of aspects 1-4, wherein the updating of the master key comprises revoking access to decrypting the ciphertext of the selected data segment.

Aspect 6. The method of any of aspects 1-5, wherein the transforming of the plurality of data segments comprises encrypting the plurality of data segments using a format-preserving encryption algorithm.

Aspect 7. The method of any of aspects 1-6, wherein the respective tags for the plurality of data segments are different from each other.

Aspect 8. The method of any of aspects 1-7, further comprising:

generating a secret key as the master key to derive the respective temporal keys for the plurality of data segments.

Aspect 9. The method of any of aspects 1-8, further comprising:

receiving an indication to delete the selected data segment from the dataset, and deleting the selected data segment from the dataset.

Aspect 10. A system to provide data security, the system comprising:

a memory to store a dataset comprising a plurality of data segments;

a processor to:

generate respective tags for the plurality of data segments;

derive respective temporal keys associated with the respective tags for the plurality of data segments from a master key;

transform the plurality of data segments in the dataset from a plaintext to a ciphertext using the respective temporal keys as a first input and the respective tags as a second input, while format-preserving the plurality of data segments; and update the master key to prevent the master key from reverse-transforming a selected data segment of the plurality of data segments from the ciphertext to the plaintext.

Aspect 11. The system of aspect 10, wherein the processor is to further change the master key to an updated master key when receiving an indication to change the selected data segment.

Aspect 12. The system of aspect 11, wherein the processor is to further revoke access to deriving, from the updated master key, the temporal key to reverse-transform the selected data segment from the ciphertext to the plaintext.

Aspect 13. The system of any of aspects 10-12, wherein the processor is to further revoke access to decrypting the ciphertext of the selected data segment.

Aspect 14. The system of any of aspects 10-13, wherein the processor is to further encrypt the plurality of data segments using a format-preserving encryption algorithm.

Aspect 15. The system of any of aspects 10-14, wherein the processor is to further generate a secret key as the master key to derive the temporal keys for the plurality of data segments.

Aspect 16. The system of any of aspects 10-15, wherein the processor is to further receive an indication to delete the selected data segment from the dataset, and delete the selected data segment from the dataset after the receiving the indication.

Aspect 17. A non-transitory computer-readable medium having computer-executable instructions stored thereon that, upon execution, cause one or more processors to perform operations comprising:

generating respective tags for a plurality of data segments in a dataset;

deriving respective temporal keys associated with the respective tags for the plurality of data segments from a master key;

transforming the plurality of data segments in the dataset from a plaintext to a ciphertext using the respective temporal keys as a first input and the respective tags as a second input, while format-preserving the plurality of data segments; and updating the master key to prevent the master key from reverse-transforming a selected data segment of the plurality of data segments from the ciphertext to the plaintext.

Aspect 18. The computer-readable medium of aspect 17, wherein the operations further comprise updating the master key to an updated master key when receiving an indication to change the selected data segment.

Aspect 19. The computer-readable medium of aspect 18, wherein the operations further comprise revoking access to deriving, from the updated master key, the temporal key to reverse-transform the selected data segment from the ciphertext to the plaintext.

Aspect 20. The computer-readable medium of any of aspects 17-19, wherein the operations further comprise encrypting the plurality of data segments using a format-preserving encryption algorithm.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method of providing data security comprising:
generating respective tags for a plurality of data segments in a dataset;
deriving respective temporal keys associated with the respective tags for the plurality of data segments from a master key;
transforming the plurality of data segments from a plaintext to a ciphertext using the respective temporal keys as a first input and the respective tags as a second input; and
updating the master key to prevent the master key from being used to derive a temporal key for reverse-transforming a selected data segment of the plurality of data segments from the ciphertext to the plaintext while maintaining an ability to derive respective temporal keys for reverse-transforming remaining data segments other than the selected data segment of the plurality of data segments, rendering the selected data segment inaccessible.

2. The method of claim 1, wherein the master key is changed to an updated master key when receiving an indication to change the selected data segment.

3. The method of claim 2, wherein the updating of the master key comprises revoking access to deriving, from the updated master key, the temporal key to reverse-transform the selected data segment from the ciphertext to the plaintext.

4. The method of claim 2, further comprising:
replacing the master key with the updated master key; and
deleting the master key.

5. The method of claim 1, wherein the updating of the master key comprises revoking access to decrypting the ciphertext of the selected data segment.

6. The method of claim 1, wherein the transforming of the plurality of data segments comprises encrypting the plurality of data segments using a format-preserving encryption algorithm.

7. The method of claim 1, wherein the respective tags for the plurality of data segments are different from each other.

8. The method of claim 1, further comprising:
generating a secret key as the master key to derive the respective temporal keys for the plurality of data segments.

9. The method of claim 1, further comprising:
receiving an indication to delete the selected data segment from the dataset, and deleting the selected data segment from the dataset.

10. A system to provide data security, the system comprising:
a memory to store a dataset comprising a plurality of data segments;
a processor to:
generate respective tags for the plurality of data segments;
derive respective temporal keys associated with the respective tags for the plurality of data segments from a master key;
transform the plurality of data segments in the dataset from a plaintext to a ciphertext using the respective temporal keys as a first input and the respective tags as a second input; and
update the master key to prevent the master key from being used to derive a temporal key for reverse-transforming a selected data segment of the plurality of data segments from the ciphertext to the plaintext while maintaining an ability to derive respective temporal keys for reverse-transforming remaining data segments other than the selected data segment of the plurality of data segments, rendering the selected data segment inaccessible.

11. The system of claim 10, wherein the processor is to further change the master key to an updated master key when receiving an indication to change the selected data segment.

12. The system of claim 11, wherein the processor is to further revoke access to deriving, from the updated master key, the temporal key to reverse-transform the selected data segment from the ciphertext to the plaintext.

13. The system of claim 10, wherein the processor is to further revoke access to decrypting the ciphertext of the selected data segment.

14. The system of claim 10, wherein the processor is to further encrypt the plurality of data segments using a format-preserving encryption algorithm.

15. The system of claim 10, wherein the processor is to further generate a secret key as the master key to derive the temporal keys for the plurality of data segments.

16. The system of claim 10, wherein the processor is to further receive an indication to delete the selected data segment from the dataset, and delete the selected data segment from the dataset after the receiving the indication.

17. A non-transitory computer-readable medium having computer-executable instructions stored thereon that, upon execution, cause one or more processors to perform operations comprising:
generating respective tags for a plurality of data segments in a dataset;
deriving respective temporal keys associated with the respective tags for the plurality of data segments from a master key;
transforming the plurality of data segments from a plaintext to a ciphertext using the respective temporal keys as a first input and the respective tags as a second input; and updating the master key to prevent the master key from being used to derive a temporal key for reverse-transforming a selected data segment of the plurality of data segments from the ciphertext to the plaintext while maintaining an ability to derive respective temporal keys for reverse-transforming remaining data segments other than the selected data segment of the plurality of data segments, rendering the selected data segment inaccessible.

18. The computer-readable medium of claim 17, wherein the operations further comprise changing the master key to an updated master key when receiving an indication to change the selected data segment.

19. The computer-readable medium of claim 18, wherein the operations further comprise revoking access to deriving, from the updated master key, the temporal key to reverse-transform the selected data segment from the ciphertext to the plaintext.

20. The computer-readable medium of claim 17, wherein the operations further comprise encrypting the plurality of data segments using a format-preserving encryption algorithm.

* * * * *